United States Patent [19]
Ehnebuske et al.

[11] Patent Number: 6,016,477
[45] Date of Patent: Jan. 18, 2000

[54] METHOD AND APPARATUS FOR IDENTIFYING APPLICABLE BUSINESS RULES

[75] Inventors: David Lars Ehnebuske, Georgetown; Barbara Jane Alspach McKee, Austin, both of Tex.

[73] Assignee: International Business Machines Corporation, Armonk, N.Y.

[21] Appl. No.: 08/993,718

[22] Filed: Dec. 18, 1997

[51] Int. Cl.[7] .................................................. G06F 17/60
[52] U.S. Cl. .................................. 705/7; 706/11; 706/60
[58] Field of Search ........................... 706/11, 60; 705/7

[56] References Cited

U.S. PATENT DOCUMENTS

| | | | |
|---|---|---|---|
| 4,752,889 | 6/1988 | Rappaport et al. | 364/513 |
| 5,170,464 | 12/1992 | Hayes et al. | 395/76 |
| 5,261,037 | 11/1993 | Tse et al. | 395/76 |
| 5,423,041 | 6/1995 | Burke et al. . | |
| 5,432,948 | 7/1995 | Davis et al. . | |
| 5,517,606 | 5/1996 | Matheny et al. . | |
| 5,627,959 | 5/1997 | Brown et al. | 395/356 |
| 5,644,770 | 7/1997 | Burke et al. . | |
| 5,802,255 | 9/1998 | Hughes et al. | 395/75 |

*Primary Examiner*—Allen R. MacDonald
*Assistant Examiner*—Susanna Meinecke-Díaz
*Attorney, Agent, or Firm*—David A. Mims, Jr.

[57] ABSTRACT

A method and apparatus for identifying decision points in Business Objects and classifying business rules that are applicable to the decision points. Business Objects are created which are decorated with business rules, either manually or programmatically. Control Points are used to represent the named decision points or triggers within the behavior of the Business Objects. The Control Points are visually exposed to business analysts to allow the examination of the business rules attached to the various Control Points. The business analysts are permitted to manually attach or detach business rules associated with the Control Points. A system can programmatically decide which rules to attach to a Control Point based on execution context.

12 Claims, 3 Drawing Sheets

METHOD AND APPARATUS FOR IDENTIFYING APPLICABLE BUSINESS RULES

FIELD OF THE INVENTION

The present invention relates to data processing systems, and more particularly, to externalizing business decisions into business rules in object-oriented objects which are describable and manipulatable by non-programmers.

CROSS REFERENCE TO RELATED APPLICATIONS

This application is related in subject matter to the following applications filed concurrently herewith and assigned to a common assignee:

Application Ser. No. 08/989,674 filed by David Ehnebuske and Barbara McKee entitled, "Method and Apparatus For Annotating Static Object Models With Business Rules" (IBM Docket AT9-97-499).

The foregoing co-pending applications are incorporated herein by reference.

BACKGROUND OF THE INVENTION

One of the claims for object-oriented programming is that it makes it easier for software to model real-life business situation. The new vision of computing is of distributed Business Objects existing as independently developed executables or binaries, which can be redeployed as self-contained units anywhere in a network, and on any platform. Businesses are finding that encapsulating business logic into Business Objects provides insufficient additional flexibility over that provided by procedural-based applications.

Although the term Business Object has been in widespread use, no formal definition existed until the Object Management Group's (OMG) Business Object Management Special Group (BOMSIG) took the task of developing a consensus meaning for the term. Business Objects are representations of the nature and behavior of real world things or concepts in terms that are meaningful to the business. Customers, products, orders, employees, trades, financial instruments, shipping containers and vehicles are all examples of real-world concepts or things that could be represented by Business Objects. Business Objects add value over other representations by providing a way of managing complexity, giving a higher level perspective, and packaging the essential characteristics of business concepts more completely. We can think of Business Objects as actors, role-players, or surrogates for the real world things or concepts that they represent.

Implementing business rules within Business Objects enables businesses to automate their policies and practices. For example, business rules can control the flow through the tasks of a business process. The next task is performed only when the rules that permit ending the previous task and those that determine that the next task should be entered have been satisfied. Business rules can also assist in decision-making and have a significant impact on decision support applications. For example, a rule system can determine whether or not to extend credit to a customer and how much credit to extend.

Historically, business rules have been embedded within the logic of applications. These applications have been designed to perform business functions, horizontal applications such as accounts receivable and inventory control or vertical applications such as portfolio analysis in financial services and insurance eligibility in healthcare. Developers have built these systems without explicit regard for business rules. As a result, when business policies and practices change—and they're constantly changing—it's difficult to reflect those changes in the applications that implement them.

More recently, business rules have been implemented in database triggers. In response to database changes, database triggers are automatically invoked by a database server. The code in the triggers could execute some procedural logic as well as manipulate the database. Database triggers and stored procedures offer the advantage of modularity. They isolate business rules and technical data-manipulation rules from application logic. Triggers automate business rules processing and provide application independence (any application changing the database causes the triggers to be fired). However, triggers also have some serious disadvantages. They are hard to develop. They are intended to implement technical data-manipulation rules as well as business rules, and they are hard to maintain and extend.

Database triggers are frequently expressed in the dialect of the databases in which they're to be implemented. These languages are frequently proprietary and complex. Development is a text-editing task. There are few, if any, visual tools to assist developers in specifying trigger code.

Database triggers function on the elements and values of a database. Their specification is far more technically oriented then business oriented. Some triggers implement business rules, but many implement and enforce data integrity and data consistency. Applications builders who are using a trigger built by another developer might have difficult deducing the business rules implemented by the trigger by looking at trigger code. Business analyst, the individuals who should be responsible for business rules specification, frequently find the triggers hard to learn.

Database triggers are also hard to maintain. Developers may find it difficult to change triggers in response to business changes. None of these database languages are object-oriented. Trigger development rarely follows the rigors and formality of large-scale application development. As a result, triggers tend to be monolithic and hard to understand.

More recently, object-oriented business rules technologies have evolved which allow rules to route work through the tasks of a business process, where reasoning can be applied to complex decision-making, and where knowledge systems can perform operator assistance.

Object-oriented business rules technologies base rule processing on an application's object model or component model. Some products based on these technologies use inferencing techniques on an application's object model to create, delete, and manipulate variables and objects and to determine their values. Other products utilize a technique which always fire a rule before or after an object method. Both of these techniques are very programmer intensive, as they are built right into the objects themselves.

Business rules are different from Business Objects. Business Objects represent business entities like customers, products, and orders. They encapsulate the data and behavior needed to perform business functions. Business rules implement the policies and practices of an organization. They control the ways that Business Objects perform business functions. An example will demonstrate the differences. For order processing, an application uses customer, product, and order Business Objects. While orders are processed, values for customer credit limits and inventory restock levels come into play. An organization may embed these values within the Business Object. But using business rules to determine these values would be more effective because business rules separate business policies from application processing. The business policies can be easily changed to reflect dynamic business changes. A credit limit may depend on factors including current receivables, credit history, time of year, product demand, product life cycle, creditor's business stability, and so on. Most Business Objects would have a hard-coded value for credit limit. Business rules can "reason" a value based on complex and timely criteria. Business rules can make a business more adaptable to business changes, more responsive to its customers, and more responsible to its stockholders.

Object-oriented technologies give business rules tremendous power and flexibility. Rules may be applied to a broad range of application resources. Individual rules may specify multiple conditions, and developers may specify complex relationships among the conditions. Systems of rules may be executed to "reason" a complex decision. And the technologies use backward chaining and/or forward chaining to iteratively and recursively evaluate rules.

The disadvantage of object-oriented business rules technologies is the traditional trade-off of power and flexibility—complexity. Use of these technologies requires skills in object-oriented design and object-oriented development. Specific products are built on proprietary and idiosyncratic object models and use proprietary languages for business rule specification.

Consequently, it would be desirable to provide a procedure for externalizing business decisions into business rules which are described and manipulated by business experts instead of programmers.

SUMMARY OF THE INVENTION

This invention relates to a method and apparatus for identifying decision points in Business Objects and classifying business rules that are applicable to the decision points. Business Objects are created which are decorated with business rules, either manually or programmatically. Control Points are used to represent the named decision points or triggers within the behavior of the business objects. The Control Points are visually exposed to business analysts to allow the examination of the business rules attached to them. The business analysts are permitted to manually attach or detach business rules associated with the Control Points. A system can programmatically decide which rules to attach to a Control Point based on execution context.

DETAILED DESCRIPTION OF THE EMBODIMENTS

This invention provides a technique for identifying decision points in a Business Object and classifying business rules that are applicable to those decision points. Control Points are used to identify the decision points or triggers within the behavior of the Business Objects. Triggers are encountered in the semantic interface of the Business Object and trigger a named Control Point. Through the named Control Points, triggers are surfaced to authorized business analysts. This permits the business domain expert to examine the rules attached to the various Control Points, and at their discretion, manually attach or detach business rules. The availability of the Control Points allows the business domain experts to reuse a decision point in different business operations of the Business Object. In addition, the Control Points provide a place to cache the business rules across multiple trigger points in the Business Object. A place is provided within the Business Object, via the Control Points, to hang requirements of the decision point with respect to the acceptability of business rules (e.g., parameters provided and result expected).

Figure 1:
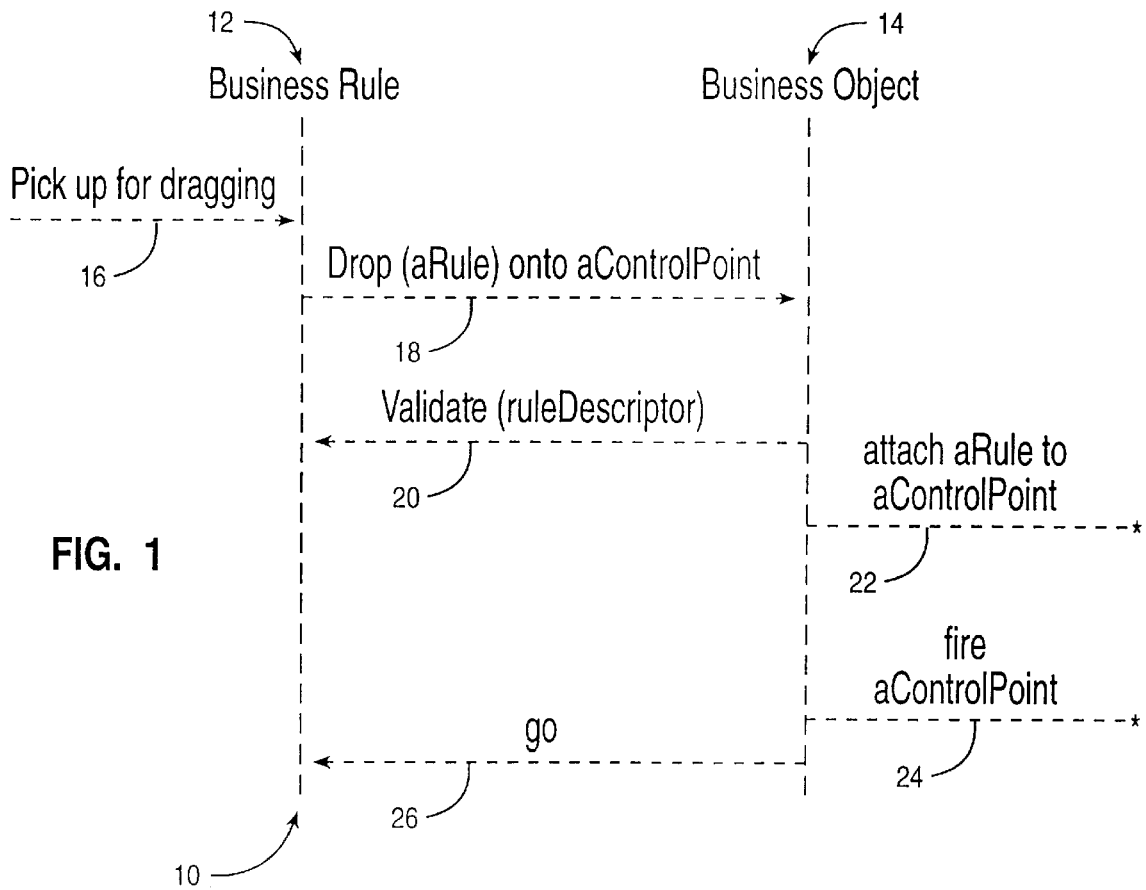
FIG. 1 is an object interaction diagram showing the manual attachment of business rules to a Business Object.
Figure 2:
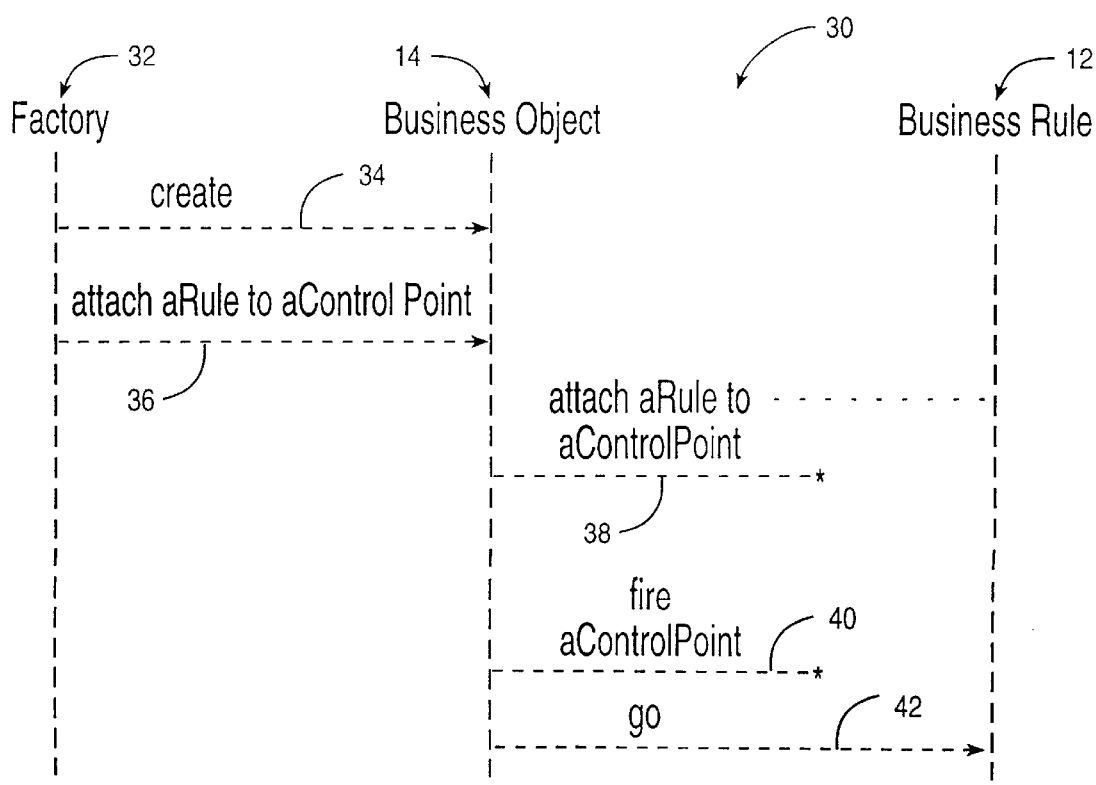
FIG. 2 is an object interaction diagram showing the attachment of business rules to a Business Object using an object factory.
Figure 3:
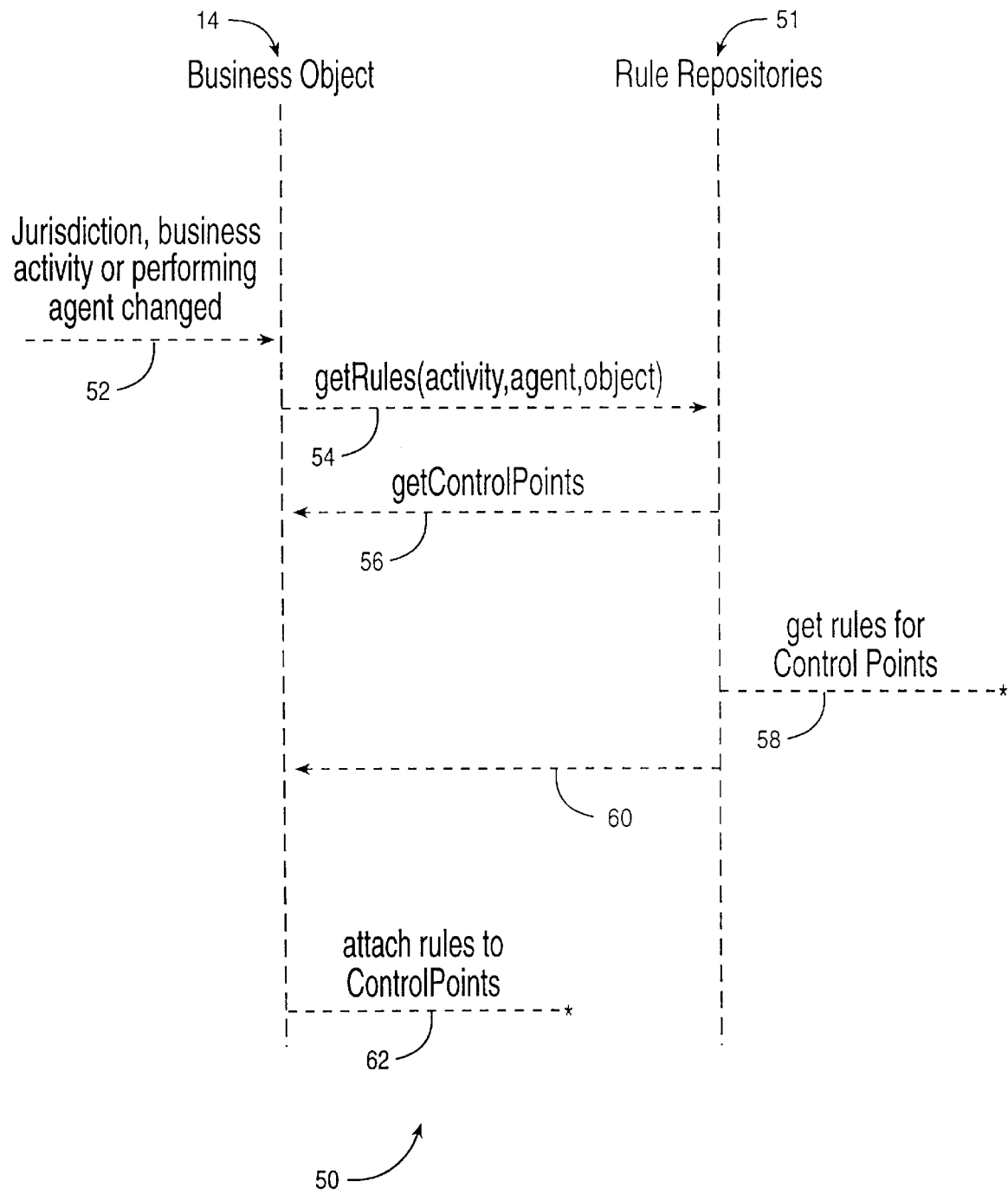
FIG. 3 is an object interaction diagram showing the attachment of business rules to a Business Object from a rules repository.

Referring now to FIG. 1, there is shown an object interaction diagram 10 for manually attaching business rules 12 to a Business Object 14. After the Business Object 14 has been created, it can be decorated with business rules 12, either manually (as shown in FIG. 1) or programmatically (as shown in FIGS. 2 and 3). When a business rule 12 is attached manually, the user performing the attachment function visually associates the business rule 12 with one of the exposed Control Points in the Business Object 14. The user performing the task picks up the business rule 16 and drags and drops it onto the identified Control Point 18 in the Business Object 14. This triggers a validation step 20 whereby the Business Object hosting the Control Point describes the parameters it is prepared to provide and the result that is expected. The business rule 12 looks at this descriptive information and decides whether it is a likely fit for that Control Point. If the validation succeeds, the business rule 12 is attached to the Control point 22. Once the business rules 12 are associated with a specific Control Point in the Business Object 14, determining which rules to fire during execution of a business transaction is relatively straight forward. When a decision point or trigger is encountered in the programmed logic of the Business Object 14, the object looks to see if there are any business rules attached to the associated Control Point. Only those business rules attached to that Control Point are fired 24 at that time and the appropriate rules are executed 26.

Turning now to FIG. 2, there is shown an object interaction diagram 30 for programmatically attaching business rules 12 to a Control Point in a Business Object 14. A Factory Object 32 can perform the attachment 36 of business rules 12 after the Business Object 14 has been created 34. The Factory Object 32 has access to collections of business rules sorted and identified by their associated Control Points. Because the business rules are prevalidated when they are placed into the rule collections, no validation of parameter and result compatibility is needed prior to attaching the rule 38 to the Control Point. The Control Points are used by the Factory Object 32 to tell the Business Object 14 where to attach 38 the various business rules. Once the business rules 12 are associated with specific Control Points in the Business Object 14, determining which rules to fire during execution of a business transaction is relatively straight forward. When a trigger is encountered in the programmed logic of the Business Object 14, the object looks to see if there are any business rules attached to the associated Control Point. Only those business rules attached to that Control Point are fired 40 at that time and the appropriate rules are executed 42.

Referring now to FIG. 3, there is shown an object interaction diagram 50 for periodically attaching business rules from rule repositories 51 to pre-defined Control Points in a Business Object 14 in order to reduce the rule identification processing that must take place during the execution of business logic. When the Business Object 14 is executed, one or more triggers may be encountered. These triggers which are associated with Control Points, represent the predefined triggers for firing applicable business rules. In addition to describing the decision points within a Business Object, the name space of Control Points is also used to categorize business rules. Knowing the identity of a Control Point triggered by a Business Object 14 makes it possible to search through the various sets of business rules to find the subset that is applicable to the triggered Control Point. The resulting set of applicable business rules can be constrained by the various jurisdictions (e.g., A range of authority. Jurisdiction objects are used to partition the space of business rules, such that when a trigger point is encountered, interested jurisdictions contribute the rules to be fired), the business activity taking place, and/or the agent performing the activity. The rule retrieval process can be optimized to only obtain rules when a Control Point is triggered, or it can be optimized to obtain rules for all Control Points in advance of their being triggered with either optimization. As each Control Point is encountered, the set of rules are cached when they are attached 62 to their respective Control Points, making the search step unnecessary when a Control Point is encountered during the normal execution of business logic. When the set of asserting jurisdictions changes, the business activity changes, or the performing agent changes 52, the cache within the Control Point can be invalidated and a new set of applicable business rules can be identified and attached 54. The Control Points 56 for the new set of applicable business rules are obtained from the business object 14, and a search is performed 58 in rule repositories 51 to identify the applicable business rules and return them 60 to the business object 14. The process of periodically acquiring the set of applicable rules and attaching them to Control Points ensures that the right set of rules is always known to the Business Object 14. Thus, when a Control Point is encountered, the set of rules to fire has already been identified and saved through attachment, and firing can immediately proceed.

Figure 4:
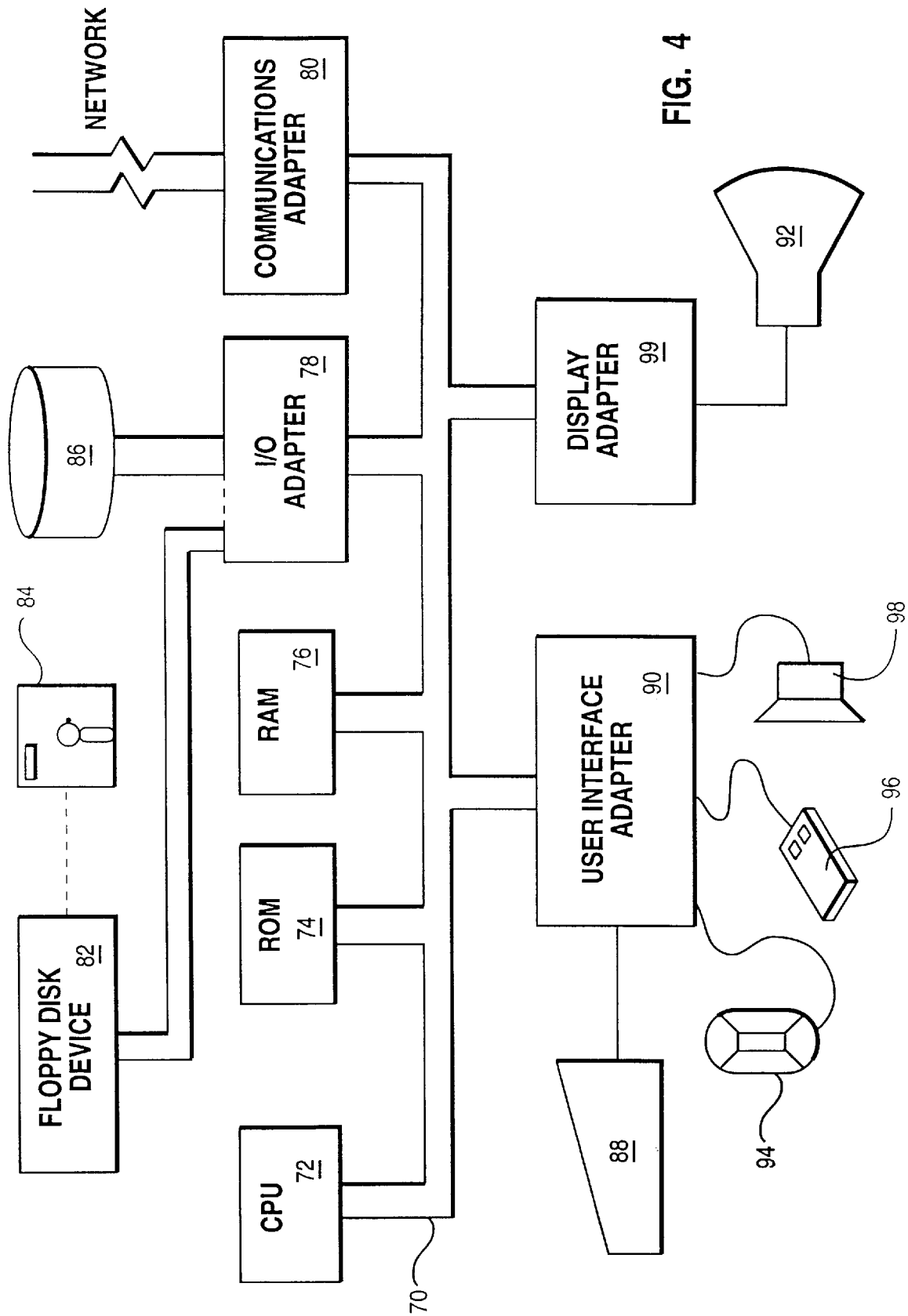
FIG. 4 is an illustrative embodiment of a computer system where the present invention may be practiced.

Referring now to FIG. 4, there is shown a pictorial representation of a workstation, having a central processing unit 72, such as a conventional microprocessor, and a number of other units interconnected via a system bus 70. The workstation shown in FIG. 4, includes a Random Access Memory (RAM) 76, Read Only Memory (ROM) 74, an I/O adapter 78 for connecting peripheral devices such as floppy disk unit 82 or hard disk 86 to the bus, a user interface adapter 90 for connecting a keyboard 88, a mouse 96, a speaker 98, a microphone 94, and/or other user interface devices such as a touch screen device (not shown) to the bus, a communication adapter 80, for connecting the workstation to a data processing network and a display adapter 99, for connecting the bus to a display device 92. The workstation, in the preferred embodiment, has resident thereon the computer software making up this invention which may be loaded from diskette 84.

While the invention has been described with respect to a preferred embodiment thereof, it will be understood by those skilled in the art that various changes in detail may be made therein without departing from the spirit, scope, and teaching of the invention. Accordingly, the herein disclosed invention is to be limited only as specified in the following claims.

What we claim is:

1. A method, implemented in a computer system, for identifying decision points in an object-oriented object, comprising the steps of:

creating said object having a plurality of decision points in said computer system;

identifying and naming points of attachment for business rules in the operation of said object for each of said plurality of decision points;

associating by name a selected one of said plurality of decision points to at least one trigger point in said object;

assigning selected business rules to said named points of attachment for business rules in said object to said named associated decision point;

executing said object in said computer system until said at least one trigger point is detected in said object attached to said named associated decision point; and displaying to a user in said computer the points of attachment for business rules in said object and the selected rules which have been associated with said named decision point.

2. The method of claim 1 wherein the step of associating further comprises:

assigning by name a selected one of said plurality of decision points to a different trigger point in said object to allow reuse of at least one of said plurality of decision points to different business operations of said object; and assigning acceptance criteria for the selected business rules to said associated decision point for said trigger point.

3. The method of claim 1 wherein the step of executing said object further comprises:

identifying a new set of business rules at a selected one of said points of attachment for business rules in said object;

verifying the acceptability of said identified business rules to said selected one of said points of attachment for business rules using rule acceptance criteria;

attaching said new set of business rules to said object to affect the operation of said object; and executing said new set of business rules for said selected one of said points of attachment for business rules for said object.

4. The method of claim 1, wherein the step of executing said object further comprises:

examining the selected business rules attached to points of attachment for business rules in said object by said user;

identifying a set of replacement rules at a selected one of said points of attachment for business rules in said object;

manually attaching said set of replacement rules to said object by said user to affect the operation of said object; and deleting at least one of said selected rules from a different one of said points of attachment for business rules by said user.

5. An apparatus for identifying decision points in an object-oriented object, comprising:

means for creating said object having a plurality of decision points in a computer system;

means for identifying and naming points of attachment for business rules in the operation of said object for each of said plurality of decision points;

means for associating by name a selected one of said plurality of decision points to at least one trigger point in said object;

means for assigning selected business rules to said named points of attachment for business rules in said object to said named associated decision point;

means for executing said object in said computer system until said at least one trigger point is detected in said object and executing rules attached to said named associated decision point; and means for displaying to a user in said computer the points of attachment for business rules in said object and the selected rules which have been associated with said named decision point.

6. The apparatus of claim 5 wherein said means for associating further comprises:

means for assigning by name a selected one of said plurality of decision points to a different trigger point in said object to allow reuse of at least one of said decision points to different business operations of said object; and means for assigning acceptance criteria for selected business rules to said associated decision point for said trigger point.

7. The apparatus of claim 5, wherein the means for executing said object further comprises:

means for identifying a new set of business rules at a selected one of said points of attachment for business rules in said object;

means for verifying the acceptability of said identified business rules to said selected one of said points of attachment for business rules using rule acceptance criteria;

means for attaching said new set of business rules to said object to affect the operation of said object; and means for executing said new set of business rules for said selected one of said points of attachment for business rules for said object.

8. The apparatus of claim 5 wherein the means for executing said object further comprises:

means for examining the selected business rules attached to points of attachment for business rules in said object by said user;

means for identifying a set of replacement rules at a selected one of said points of attachment for business rules in said object;

means for manually attaching said set of replacement rules to said object by said user to affect the operation of said object; and means for deleting at least one of said selected rules from a different one of said points of attachment for business rules by said user.

9. A computer program product having a computer readable medium having computer program logic recorded thereon for identifying decision points in an object-oriented object, comprising:

computer readable means for creating said object having a plurality of decision points in a computer system;

computer readable means for identifying and naming points of attachment for business rules in the operation of said object for each of said plurality of decision points;

computer readable means for associating by name a selected one of said plurality of decision points to at least one trigger point in said object;

computer readable means for assigning selected business rules to said named points of attachment for business rules in said object to said named associated decision point;

computer readable means for executing said object in said computer system until said at least one trigger point is detected in said object and executing rules attached to said named associated decision point; and computer readable means for displaying to a user in said computer the points of attachment for business rules in said object and the selected rules which have been associated with said named decision point.

10. A computer program product of claim 9 wherein said computer readable means for associating further comprises:

computer readable means for assigning by name a selected one of said plurality of decision points to a different trigger point in said object to allow reuse of at least one of said decision points to different business operations of said object; and computer readable means for assigning acceptance criteria for selected business rules to said associated decision point for said trigger point.

11. A computer program product of claim 9, wherein said computer readable means for executing said object further comprises:

computer readable means for identifying a new set of business rules at a selected one of said points of attachment for business rules in said object;

computer readable means for verifying the acceptability of said identified business rules to said selected one of said points of attachment for business rules using said rule acceptance criteria;

computer readable means for attaching said new set of business rules to said object to affect the operation of said object; and computer readable means for executing said new set of business rules for said selected one of said points of attachment for business rules for said object.

12. A computer program product of claim 9 wherein said computer readable means for executing said object further comprises:

computer readable means for examining the selected business rules attached to points of attachment for business rules in said object by said user;

computer readable means for identifying a set of replacement rules at a selected one of said points of attachment for business rules in said object;

computer readable means for manually attaching said set of replacement rules to said object by said user to affect the operation of said object; and computer readable means for deleting at least one of said selected rules from a different one of said points of attachment for business rules by said user.

* * * * *